United States Patent
Acharya et al.

(10) Patent No.: US 7,266,151 B2
(45) Date of Patent: *Sep. 4, 2007

(54) METHOD AND SYSTEM FOR PERFORMING MOTION ESTIMATION USING LOGARITHMIC SEARCH

(75) Inventors: Tinku Acharya, Chandler, AZ (US); Kalpesh Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 10/242,148

(22) Filed: Sep. 11, 2002

(65) Prior Publication Data

US 2004/0047422 A1   Mar. 11, 2004

Related U.S. Application Data (63) Continuation-in-part of application No. 10/235,121, filed on Sep. 4, 2002.

(51) Int. Cl.
  *H04N 7/12* (2006.01)
  *G06K 9/36* (2006.01)
(52) U.S. Cl. ................... 375/240.16; 382/236
(58) Field of Classification Search ........... 375/240.16, 375/240.14, 240.24, 240.26; 348/416.1, 348/699, 420.1; 382/236, 234, 304; 700/2; 712/12

See application file for complete search history.

(56) References Cited

U.S. PATENT DOCUMENTS

| | | | |
|---|---|---|---|
| 4,908,751 A * | 3/1990 | Smith ........................... 712/12 |
| 5,473,379 A | 12/1995 | Horne |
| 5,602,727 A * | 2/1997 | Kurokawa et al. ............. 700/2 |
| 5,649,029 A | 7/1997 | Galbi |
| 5,706,059 A * | 1/1998 | Ran et al. .................... 348/699 |
| 5,739,872 A | 4/1998 | Kim et al. |
| 5,757,668 A | 5/1998 | Zhu |
| 5,838,827 A * | 11/1998 | Kobayashi et al. ......... 382/236 |
| 5,875,122 A | 2/1999 | Acharya |
| 5,995,210 A | 11/1999 | Acharya |
| 6,005,980 A | 12/1999 | Eifrig et al. |

(Continued)

FOREIGN PATENT DOCUMENTS

EP    0592128    4/1994

OTHER PUBLICATIONS

Her-Ming Jong, Parallel Architectures for 3-Step Hierarchical Search BLock-Matching Algorithm, Aug. 1994, IEEE Transaction on Circuits Systems for Video Technology, vol. 4 No. pp. 407-416.*

(Continued)

*Primary Examiner*—Gims Philippe
(74) *Attorney, Agent, or Firm*—Blakely, Sokoloff, Taylor & Zafman LLP (57) ABSTRACT

A method, apparatus, and system for performing motion estimation using a logarithmic search are described. One or more image signal processing engines including a plurality of processing elements are employed. The one or more image signal processing engines are mutually coupled by a register file switch, and the one or more image signal processing engines perform a block matching calculation that includes a sum of absolute differences. The plurality of processing elements is further mutually coupled such that, during the block matching calculation, parallel processing and pixel data sharing of reference block pixel locations is employed by the plurality of processing elements.

12 Claims, 5 Drawing Sheets

U.S. PATENT DOCUMENTS

| | | |
|---|---|---|
| 6,009,201 A | 12/1999 | Acharya |
| 6,009,206 A | 12/1999 | Acharya |
| 6,037,987 A | 3/2000 | Sethuraman |
| 6,047,303 A | 4/2000 | Acharya |
| 6,058,142 A | 5/2000 | Ishikawa et al. |
| 6,091,851 A | 7/2000 | Acharya |
| 6,094,508 A | 7/2000 | Acharya et al. |
| 6,108,039 A | 8/2000 | Linzer et al. |
| 6,108,453 A | 8/2000 | Acharya |
| 6,118,901 A * | 9/2000 | Chen et al. ............... 382/236 |
| 6,124,811 A | 9/2000 | Acharya et al. |
| 6,130,960 A | 10/2000 | Acharya |
| 6,151,069 A | 11/2000 | Dunton et al. |
| 6,151,415 A | 11/2000 | Acharya et al. |
| 6,154,493 A | 11/2000 | Acharya et al. |
| 6,166,664 A | 12/2000 | Acharya |
| 6,178,269 B1 | 1/2001 | Acharya |
| 6,195,026 B1 | 2/2001 | Acharya |
| 6,208,692 B1 | 3/2001 | Song et al. |
| 6,215,908 B1 | 4/2001 | Pazmino et al. |
| 6,215,916 B1 | 4/2001 | Acharya |
| 6,229,578 B1 | 5/2001 | Acharya |
| 6,233,358 B1 | 5/2001 | Acharya |
| 6,236,433 B1 | 5/2001 | Acharaya et al. |
| 6,236,765 B1 | 5/2001 | Acharya |
| 6,258,796 B1 | 7/2001 | Richards |
| 6,269,181 B1 | 7/2001 | Acharya |
| 6,275,206 B1 | 8/2001 | Tsai et al. |
| 6,292,114 B1 | 9/2001 | Tsai et al. |
| 6,301,392 B1 | 10/2001 | Acharya |
| 6,330,282 B1 | 12/2001 | Miyazaki |
| 6,348,929 B1 | 2/2002 | Acharya et al. |
| 6,351,555 B1 | 2/2002 | Acharya et al. |
| 6,356,276 B1 | 3/2002 | Acharya |
| 6,366,692 B1 | 4/2002 | Acharay |
| 6,366,694 B1 | 4/2002 | Acharay |
| 6,373,481 B1 | 4/2002 | Tan et al. |
| 6,377,280 B1 | 4/2002 | Acharya et al. |
| 6,381,357 B1 | 4/2002 | Tan et al. |
| 6,392,699 B1 | 5/2002 | Acharya |
| 6,449,380 B1 | 9/2002 | Acharya et al. |
| 6,501,799 B1 | 12/2002 | Kohn |
| 6,535,648 B1 | 3/2003 | Acharya |
| 6,556,242 B1 | 4/2003 | Dunton et al. |
| 6,563,948 B2 | 5/2003 | Tan et al. |
| 6,574,374 B1 | 6/2003 | Acharya |
| 6,600,833 B1 | 7/2003 | Tan et al. |
| 6,625,308 B1 | 9/2003 | Acharya et al. |
| 6,625,318 B1 | 9/2003 | Tan et al. |
| 6,628,716 B1 | 9/2003 | Tan et al. |
| 6,628,827 B1 | 9/2003 | Acharya |
| 6,633,610 B2 | 10/2003 | Acharya |
| 6,639,691 B2 | 10/2003 | Acharya |
| 6,640,017 B1 | 10/2003 | Tsai et al. |
| 6,650,688 B1 | 11/2003 | Acharya et al. |
| 6,654,501 B1 | 11/2003 | Acharya et al. |
| 6,658,399 B1 | 12/2003 | Acharya et al. |
| 6,694,061 B1 | 2/2004 | Acharya |
| 6,697,534 B1 | 2/2004 | Tan et al. |
| 6,731,706 B1 | 5/2004 | Acharya et al. |
| 6,731,807 B1 | 5/2004 | Pazmino et al. |
| 6,748,017 B1 | 6/2004 | Joung |
| 6,748,118 B1 | 6/2004 | Acharya et al. |
| 6,757,430 B2 | 6/2004 | Metz et al. |
| 6,759,646 B1 | 7/2004 | Acharya et al. |
| 6,798,901 B1 | 9/2004 | Acharya et al. |
| 6,813,384 B1 | 11/2004 | Acharya et al. |
| 6,825,470 B1 | 11/2004 | Bawolek et al. |
| 6,850,569 B2 * | 2/2005 | Park et al. ............. 375/240.16 |
| 6,954,228 B1 | 10/2005 | Acharya et al. |
| 6,961,472 B1 | 11/2005 | Acharya et al. |
| 7,053,944 B1 | 5/2006 | Acharya et al. |
| 7,065,253 B2 | 6/2006 | Acharya et al. |
| 2001/0014166 A1 | 8/2001 | Hong |
| 2001/0046264 A1 | 11/2001 | Fandrianto et al. |
| 2002/0017914 A1 | 2/2002 | Roggel |
| 2002/0064228 A1 | 5/2002 | Sethuraman et al. |
| 2003/0106053 A1 | 6/2003 | Sih et al. |
| 2003/0108247 A1 | 6/2003 | Acharya et al. |
| 2003/0174252 A1 | 9/2003 | Bellas et al. |
| 2004/0057626 A1* | 3/2004 | Acharya et al. ............. 382/236 |
| 2004/0207725 A1 | 10/2004 | Fandrianto et al. |
| 2005/0213661 A1 | 9/2005 | Xiang et al. |

OTHER PUBLICATIONS

Acharya, Tinku, "Discrete Filter", U.S. Appl. No. 09/432,337, filed Nov. 2, 1999, 11 pages.

Acharya, Tinku, et al., Dual Mode Filter for Mobile. Telecommunications, U.S. Appl. No. 09/467,611, filed Dec. 20, 1999, 49 Pages.

Acharya, Tinku, "Method of Converting a Sub-Sampled Color Image", U.S. Appl. No. 09/461,068, filed Dec. 14, 1999, 22 Pages.

Acharya, Tinku, et al., "Method of Interpolating Color Pixel Signals from a SubSampled Color Image", U.S. Appl. No. 09/410,800, filed Oct. 1, 1999, 20 pages.

Acharya, Tinku, et al., "Method of Using Hue to Interpolate Color Pixel Signals", U.S. Appl. No. 09/591,867, filed Jun. 12, 2000, 23 Pages.

Dubiusson, Severine, et al., "Motion Compensation Using Adaptive Rectangular Partioions", *IEEE 1999, Universite de Technologie de Compiegne,* (1999),56-60.

Ebrahimi, Tourdaj, "MPEG-4 Video Verification Model Version 8.0", *International Organisation for standardisation Organisation Internationale De Normalisation ISO/IECJTC1/SC29/WG1. XP-002177337,* (Jul. 1997),1-283.

Kim, Hyun M., et al., "CAS: Context Adaptive Search for Motion Estimation", *Intel Corporation,* Chandler Arizona. *IEEE 2000. XP-002190533,* (Feb. 4, 2001),202-206.

Kossentini, Faouzi, et al., "Predictive RD Optimized Motion Estimation for Very Low Bit-Rate Video Coding", *IEEE Journal on Selected Area in Communications,* vol. 15, No 9. XP-000726013, (Dec. 1, 1997), 1752-1762.

Kuhn, P., "Algorithms, Complexity Analysis and VLSI Architectures for MPEG-4 Motion Estimation", *Klumer Academic Publishers,* Boston/Dordrecht/London, *ISBN 0-7923-8516-2, chapter 2,* (1999), 17-60.

Sullivan, G.J., et al., "Rate Distortion Optimization for Video Compression", *IEEE Signal Processing Magazine,* (Nov. 1998),74-90.

\* cited by examiner

| PE-> | PE0 | | PE1 | | PE2 | | |
|---|---|---|---|---|---|---|---|
| t0 | x0 | x1 | x0 | x1 | x0 | x1 | |
| | y0 | y1 | y'0 | y'1 | y"0 | y"1 | |
| t1 | x2 | x3 | x2 | x3 | x2 | x3 | |
| | y2 | y3 | y'2 | y'3 | y'''2 | y'''3 | |
| t2 | x4 | x5 | x4 | x5 | x4 | x5 | |
| | y4 | y5 | y'4 | y'5 | y'''4 | y'''5 | Partial-row SAD |
| t3 | x6 | x7 | x6 | x7 | x6 | x7 | |
| | y6 | y7 | y'6 | y'7 | y'''6 | y'''7 | |
| t4 | x8 | x9 | x8 | x9 | x8 | x9 | |
| | y8 | y9 | y'8 | y'9 | y'''8 | y'''9 | |
| t5 | x10 | x11 | x10 | x11 | x10 | x11 | |
| | y10 | y11 | y'10 | y'11 | y'''10 | y'''11 | |
| t6 | x12 | x13 | x12 | x13 | x12 | x13 | |
| | Y12 | y13 | y'12 | y'13 | y'''12 | y'''13 | |
| t7 | x14 | x15 | x14 | x15 | x14 | x15 | |
| | y14 | y15 | y'14 | y'15 | y'''14 | y'''15 | |

METHOD AND SYSTEM FOR PERFORMING MOTION ESTIMATION USING LOGARITHMIC SEARCH

This patent application is a U.S. Continuation-In-Part Patent Application of "Motion Estimation," by Acharya et al., filed on Sep. 4, 2002, U.S. patent application Ser. No. 10/235,121 assigned to the assignee of the current invention and herein incorporated by reference.

BACKGROUND

The present disclosure relates to motion estimation and, more particularly, to structures and techniques for computing matching criteria typically employed in motion estimation.

Video coding employing Motion Estimation (ME) and/or Motion Compensation (MC) is widely used in various video coding standards and/or specifications, such as MPEG [see Moving Pictures Experts Group, ISO/IEC/SC29/WG11 standard committee]. Advances, for example, in integrated circuit technology, in recent times have made it possible to implement block matching techniques in hardware, such as with silicon or semiconductor devices. An excellent discussion of ME may be found in Bhaskara and Constantis, [see V. Bhaskaran and K. Konstantinides. "Image and Video Compression Standards: Algorithms and Architectures", Kluwer Academic Publishers, 1995.]

Figure 1:
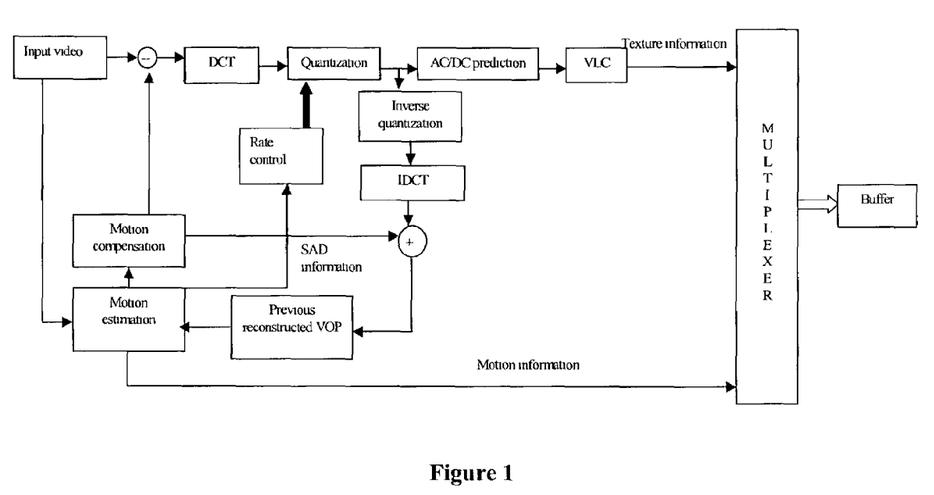
FIG. 1 is a schematic diagram illustrating an embodiment of an MEPG video encoder.

FIG. 1 shows a block diagram of an embodiment of an MPEG type video encoder. For this particular embodiment, a process of block matching involves a reference block and a search window. There are many matching criteria developed in the literature for matching a block of pixels in a video frame (usually the current frame to be encoded) with a block of pixels in the search window in another frame (usually a previous frame). A "reference block" in this context refers to a selected group of pixels from the current frame to be encoded. In MPEG, this is popularly called a macroblock and usually the size of this macroblock is 16×16. A search window in this context refers to a region of pixels from another frame, frequently the previous frame, to be searched to determine the best match. The "Sum-of-Absolute-Difference" (SAD), generally equivalent to the "Mean Absolute Difference" (MAD), is popular amongst a variety of potential matching criteria because of its low computational burden with the ability to omit multiplication or division. Some other examples of matching criteria include Mean Absolute Difference (MAD), Mean Square Error (MSE), Normalized Cross-Correlation Function, Minimized Maximum Error (MiniMax), etc. Of course, any one of a variety of matching criteria may be employed in block matching and, in this context, no particular matching criteria is preferred over any other; although, depending on the particular application, there may be reasons to prefer one over another.

Usually, a search begins with the motion vector, MV=(0, 0) or no motion. For this particular embodiment, a search window is the block of pixels from a previous frame around MV=(0,0). The block size and choice of search window size typically reflects an implementation trade-off; therefore, again, no particular size is necessarily preferred over another in this context. For example, the larger the search window, the higher the computational complexity and memory/data bandwidth capability desired, but, likewise, improved is the chance to get a good match. FIG. 1 shows reference block A in the current frame (I) and the best match block B within the search window in the previous frame (P). The displacement (dx, dy) of the matching block B at location/coordinate (x+dx, y+dy) from the reference block A at coordinate (x, y) is called the motion vector and represented as MV=(dx, dy). The technique to compute this MV is popularly referred to as Motion Estimation (ME). There are several motion estimation techniques in the literature [see, for example, V. Bhaskaran and K. Konstantinides. "Image and Video Compression Standards: Algorithms and Architectures", Kluwer Academic Publishers, 1995.] In this particular embodiment, full-search (FS) Block Matching is employed. However, this approach may be demanding from the viewpoint of raw computational power as well as the appropriate data bandwidth rate desired to support such an approach.

BRIEF DESCRIPTION OF THE DRAWINGS

The subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

As indicated previously, a full search technique is typically computationally intensive. Therefore, for high speed video encoding applications, it has proven desirable to instead implement a logarithmic window search, rather than a full search. In one embodiment of a logarithmic search technique, instead of computing the SAD value in every position within the search window, first an SAD is computed at, for example, location (0, 0) and 8 other search points, such as, for example, at coordinates (0, d), (0, −d), (d, 0), (−d, 0), (d, d), (d, −d), (−d, d), (−d, −d), where, in this example, 2d is the dimension of the search window (e.g. for a 32×32 search window, d=16). The location that gives the most desirable SAD, is the match location and the search is now narrowed down to a d×d search window centering at this location. This is continued until the search window size is narrowed down to size 1×1. Hence, for such an embodiment, the overall number of search locations is $$8 * \left\lceil \log_2 \frac{d}{2} \right\rceil + 1,$$

where 2d is the size of the initial search window. For example, with a 32×32 (e.g., d=32) search window the total number of search points will be 8*4+1=33.

Figure 2:
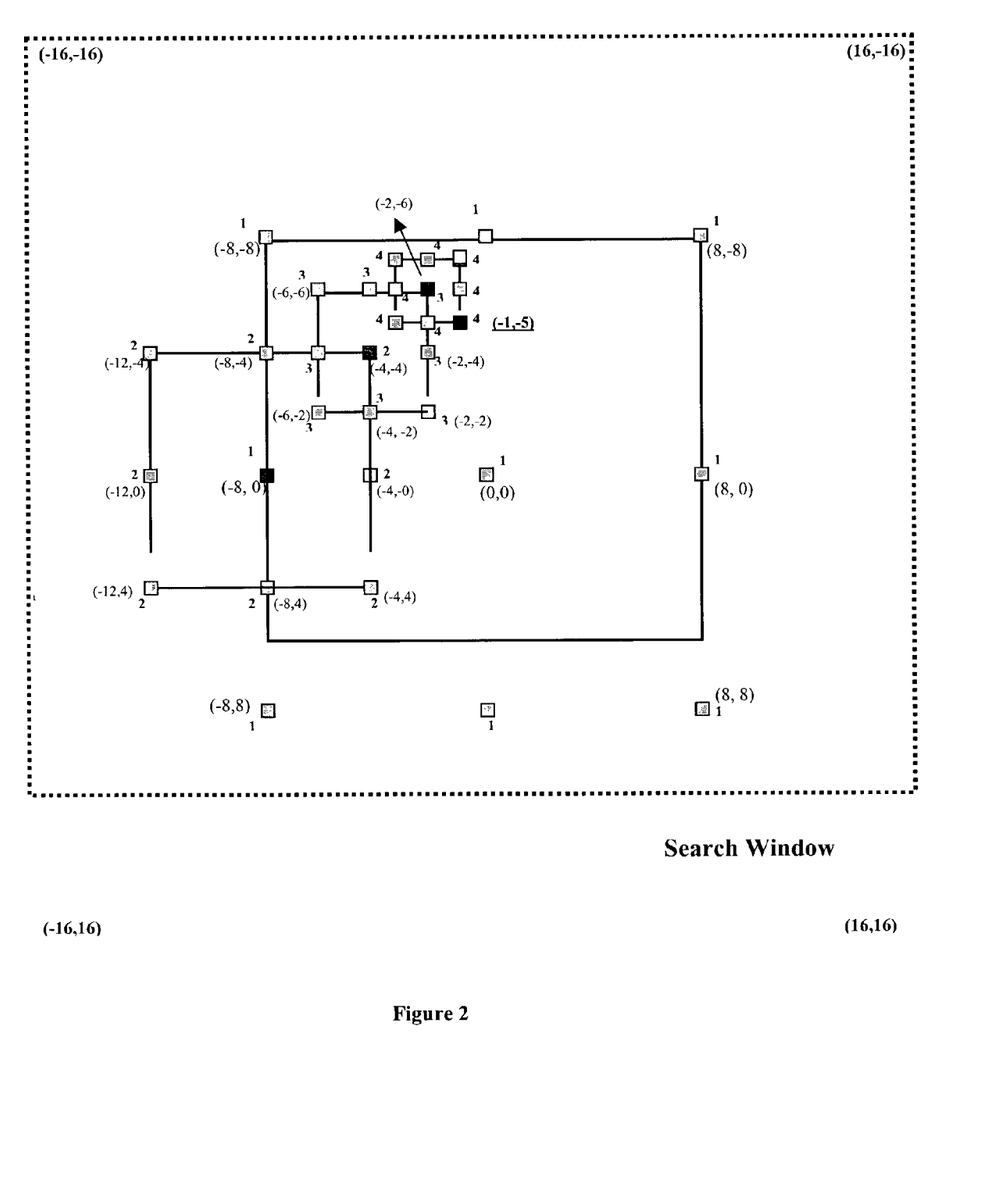
FIG. 2 is a schematic diagram illustrating an embodiment of a logarithmic window search.

Referring to FIG. 2, with a 32×32 search window, for example, first the SAD is computed at nine search points indicated by the little shaded squares with number 1. The central search point is considered to be the (0, 0) location. The initial search points in this example are located at (0, 0), (0, 8), (0, −8), (8, 0), (−8, 0), (8, −8), (−8, 8), (−8, −8) and (8, 8) within the 16=16 region centering (0,0). Assume here that the search point (−8,0) has the most desirable SAD, indicated by a dark shaded little square. Second, the SAD is computed at 8 search points marked by 2 within the 8×8 region centering (−8, 0). Assume that the most desirable SAD search point occurs at the upper right corner search point at location (−4, −4) indicated by a dark square marked 2 shown in FIG. 2. Third, the SAD is computed at 8 search points marked by number 3 within the 4×4 region centering (−4, −4) as shown in FIG. 2. Assume that the most desirable SAD search point occurs at the upper right corner search point at location (−2, −6) indicated by a dark square marked 3 shown in FIG. 2. Fourth, the SAD is computed at 8 search points marked by number 4 within the 2×2 region centering around (−2, −6) shown in FIG. 2. Assume that the most desirable SAD occurs at the lower right corner search point at location (−1, −5). The search region now narrows down to 1×1 and (−1, −5) is the match location for the reference block in this example. Hence, the motion vector is (−1, −5).

A representative or sample raw performance and/or bandwidth capability to implement a logarithmic search (LS) method may be calculated. Computing a motion vector, where, for example, the Sum-of-Absolute Difference (SAD) is employed, involves a comparison between a reference block and a corresponding block in a previous frame in 33 selected positions in a 32×32 search window and 41 selected positions in a 64×64 window, for example. Assume that the size of a search window is S×S, resolution of the video is M×N and the frame rate is F frames per second. For a 16×16 macroblock, for example, the number of SAD computations per second involved in LS motion estimation is F*33*(S*S)*(M*N)/(16*16) for a 32×32 search window and F*41*(S*S)*(M*N)/(16*16) for a 64×64 search window.

As is well-known, the CCIR standard for video employs resolution of 720×480 at 30 frames per second. In MPEG2 and MPEG4 video, the size of a search window for block matching is 32×32 and the corresponding search window selection mode is indicated by a variable, Fcode=1. For Fcode=2, 3, . . . , the search window sizes are 64×64, 128×128, . . . , respectively. Although the claimed subject matter is not limited to these block sizes, resolutions or particular search windows, nonetheless, employing them to perform calculations for a potential implementation is instructive. Hence, the computational burden involved for 720×480 resolution video at 30 frames per second is approximately.

Approximately 1.4 Million SAD computations for 32×32 search window (Fcode=1)

Approximately 1.8 Million SAD computations for 64×64 search window (Fcode=2)

Likewise, representative or sample bandwidth calculations may also be performed. A simplifying assumption is that individual processing elements (PE) in the motion estimation architecture do not have local storage within the PE, and, therefore, a PE is feed with pixel information for SAD computations. Data for an SAD computation is 512 Bytes in this embodiment—here, 256 bytes for a reference block and 256 for a matching block. Hence, the data bandwidth per second in this example is as follows.

For a 32×32 search window (Fcode=1)=1.4M*512 Bytes=716 MB

For a 64×64 search window (Fcode=2)=1.8M*512 Bytes=920 MB

Figure 3:
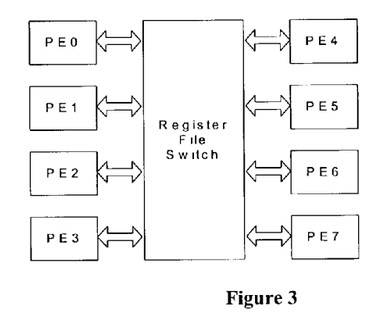
FIG. 3 is a schematic diagram illustrating an embodiment of a cross-bar coupled ISP.

An embodiment of a method for motion estimation employing an architecture 100 that includes a cross-bar coupled image signal processor (ISP) is described. Such an embodiment provides advantages in terms of computational performance and/or bandwidth utilization, as described in more detail hereinafter. Here, an ISP may comprise several basic processing elements (PE) coupled together via a register file switch, as shown in FIG. 3.

Although the claimed subject matter is not limited in scope in this respect, in this particular embodiment, a register file 200 comprises a bank of 16 registers. In this embodiment, a register may be written to by any PE and may be read by any PE. Thus, a register may be used as a link to send data from one PE to another. A register has 8-write ports, so that, for this particular embodiment, any PE may write to it. Likewise, here a register has 8 read port that couples to all PEs. The register file in this embodiment also includes a stalling mechanism that stalls a PE attempting to write when (a) there is a higher priority PE that is also attempting to write in the same cycle and/or (b) the register has unread data. It is of course appreciated that alternate embodiments may omit a register file or may employ a register file with additional and/or different capabilities.

Using general-purpose registers (GPRs) in the register file switch, a PE may communicate with another PE in the ISP in this particular embodiment. Here, there are up to 16 GPRs in a register file switch allowing concurrent communication between various PEs at substantially the same time, if desired.

In this particular embodiment, a GPR may be written and read by any PE. Likewise, in this particular embodiment, a PE may write to and read from any GPR. For example, PE0 may use GR0 to send data to PE1. At substantially the same time, PE2 may use GR2 to send data to PE4, etc. Thus, although the claimed subject matter is not limited in scope in this respect, there may be up to 16 concurrent transfers occurring on a given cycle.

In this embodiment, therefore, the register file switch provides a mechanism for sharing data between PEs. Although the claimed subject matter is not limited in scope in this respect, in this embodiment, a PE has a dual SAD computation capability by performing SAD computations in parallel. A SAD may be implemented in this embodiment using a special instruction, directed to the processing elements (PEs). One aspect of implementing this particular embodiment is mapping tasks to this architecture so that communication between PEs occurs efficiently with relatively low communication overhead.

In this particular embodiment, as illustrated in FIG. 3, an ISP includes the register file switch to provide a non-blocking mechanism for PEs to mutually communicate. In this embodiment, the register file switch comprises a full N×N switch. A PE may use a register to direct data to one or more PEs. In this particular embodiment, the Data Valid (DV) bits in a register provide a technique of targeting register data to a specific PE or a number of PEs, although, of course, the claimed subject matter is not limited in scope in this respect.

Figure 8:
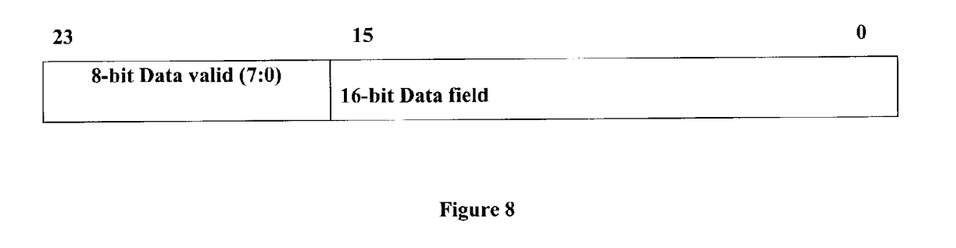
FIG. 8 is a schematic diagram of an embodiment of a layout for a GPR.

FIG. 8 is a schematic diagram illustrating an embodiment of a layout for a GPR. In this embodiment, a 16-bit data field holds the actual value of the data to be transferred from one PE to one or more other PEs. An 8-bit data field (DV7-DV0) field operates here similar to an address field. It indicates in this embodiment for which PE data is valid. If DV0 is '1', then this data is intended for PE0. Similarly, if DV1='1' then this data is intended for PE1. If all DVx's are 1, (DV0=1, DV1=1, ..., DV7=1) then this data is intended for all the PEs (e.g., this mechanism provides unicast, multicast and broadcast functionality).

In this embodiment, the PEs within an ISP may be customized to perform specific functions. For example, an input PE (IPE) may be employed to move data into registers on the ISP from a source external to the ISP. Similarly, one or more memory PEs (MPEs) may provide local storage to the PEs. An output PE (OPE) may be employed to move processed data out of an ISP. For example, an IPE and/or OPE may interface to SDR/DDR or other memory technology, for example, to move data into and out of an image processor. A general-purpose PE (GPE) may provide general-purpose processing functionality. In this embodiment, then, although the claimed subject matter is not limited in scope in this respect, for example, an ISP may comprise: an IPE, an OPE, 1 or more MPEs and 1 or more GPEs. The configuration of the ISP may depend, at least in part, on the particular application, including the mapping approach used to map the computation process to the ISP, as described in more detail herein after.

Figure 4:
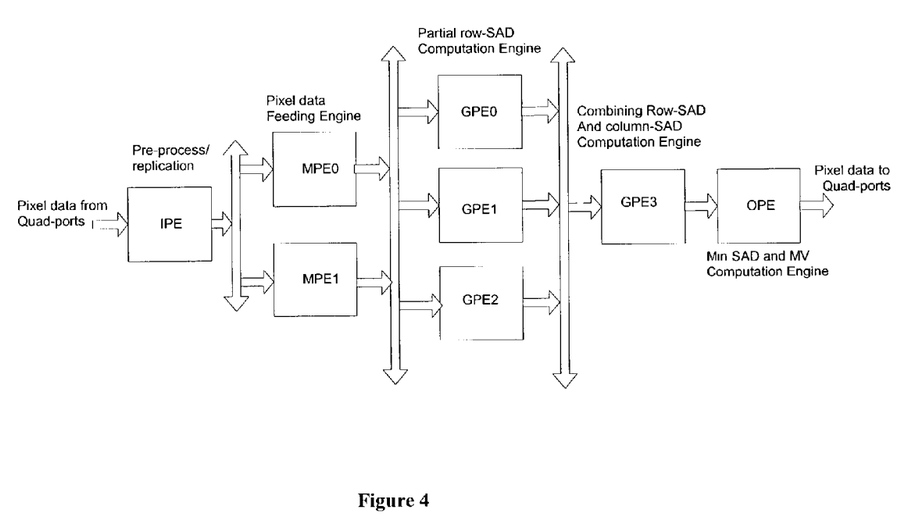
FIG. 4 is a schematic diagram illustrating another embodiment of an ISP.
Figure 5:
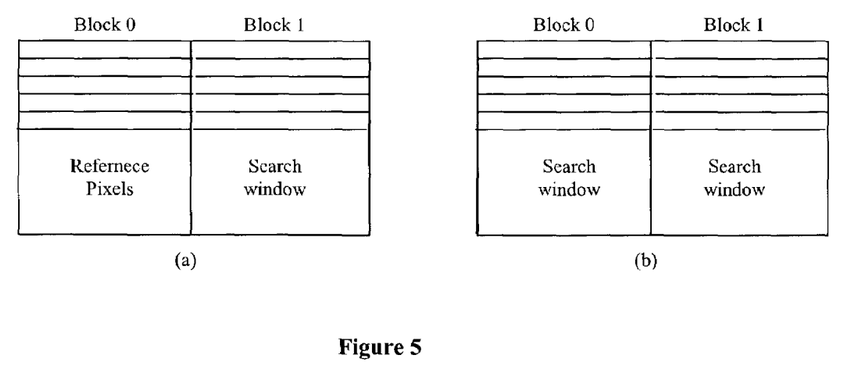
FIG. 5 is a schematic diagram illustrating an embodiment of a memory map that may be employed in connection with the embodiment shown in FIG. 4 to implement a logarithmic window search.

Since the computational power and bandwidth desired may in some instances be relatively high, using a single high-performance processor or a DSP to perform motion estimation may not provide a practical solution. In this embodiment, instead, the LS process is, in essence, "mapped" to multiple ISPs to take advantage of the ISP engines described above. In this particular embodiment, although the claimed subject matter is not limited in scope in this regard, the data and computation flows within the ISP are distributed amongst the PE,s as shown in FIG. 4. The IPE, in this embodiment, for example, could be used to pre-process incoming data, such as replicating the data, rearranging data patterns, etc. The MPEs may receive the reference block and the search window information through an IPE and may store the data in its local memory. FIG. 5 illustrates an embodiment of a memory map for mapping the reference block and search window to MPE0 and MPE1, although, of course, the claimed subject matter is not limited in scope to this particular embodiment. In order to store the reference block and the search window information, about 1.5 KB of memory is desired for MPE0 and 2KB for MPE1, assuming a 32×32 search window:

$$(16 \times 16)+(32 \times 32)+(16 \times 16) \text{ Bytes} = \sim 1.5\text{KB} \quad \text{(MPE0)}$$

$$(32*32)+(32*32)=2\text{KB} \quad \text{(MPE1)}$$

In order to mitigate potential bandwidth constraints, 3 PEs (e.g., GPE0, GPE1, GPE2 in FIG. 4) are employed in parallel in this embodiment to execute the SAD computation. The 3 PEs are operated in such a way as to share data between them.

In order to illustrate the concept, consider the case where GPE0, GPE1, and GPE2 run in parallel to compute an SAD for consecutive positions in the search window. The MPEs may store the reference macroblock and the search region, such as in MPE0 and MPE1, and feed the 3 PEs with data. In this embodiment, the reference macroblock may be fed to PEs using a set of 3 GPRs. The data from a search window in a previous frame may be fed to using a GPR.

Since the PEs are computing the SADs for discrete positions, as alluded to above, pixel data may be shared in this particular embodiment, although the claimed subject matter is not limited in scope in this respect. For example, one GPR may be employed for sending reference block information to 3 PEs, although the claimed subject matter is not limited in scope in this respect. For a row of SAD computation, for example, PE0, PE1 and PE2 may share 16 pixels of the reference region. Hence, to feed data to 3 PEs working in parallel, 16*4 pixel data per row for 3 SAD computations may be employed for this embodiment, although, again, the claimed subject matter is not limited in scope to this example embodiment.

Figure 6:
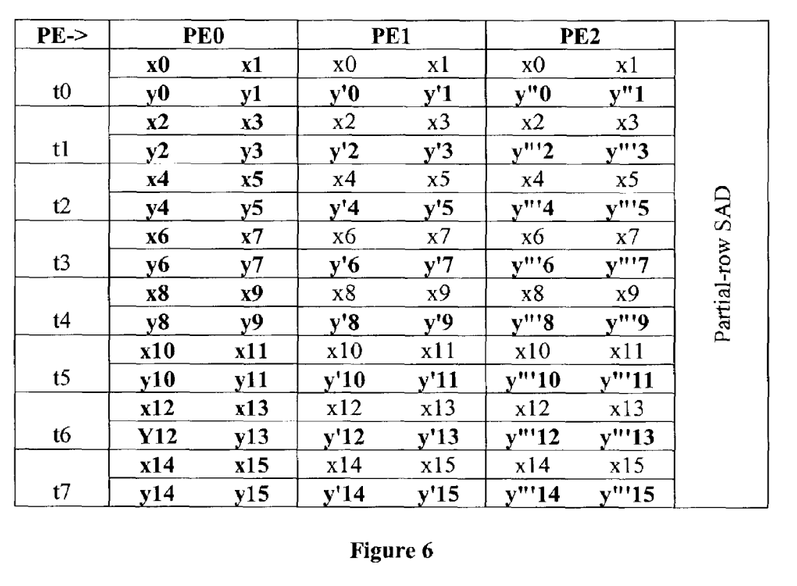
FIG. 6 is a diagram illustrating the dataflow for an ISP employing 3 PEs performing parallel calculations.

For the following discussion, reference is made to FIG. 6. The data flow of the macroblock and search window between MPEs and PEs in this particular embodiment is shown in FIG. 6. The data flow is developed in this embodiment using the assumption that an MPE may deliver 2 words in a cycle, although, again, the claimed subject matter is not limited in scope in this respect. The architecture for this particular embodiment is such that it is desirable to provide two words per cycle. The pipeline diagram of FIG. 6 illustrates 2 words per cycle will keep 3 PEs busy and also yield high throughput, as desired. Note that here a PE computes 1 partial row SAD using dual SAD feature resulting in 3 partial row SADs in 8 cycles. In this embodiment, 2SADs/cycle are implemented in a PE utilizing 16 bit data paths. The GPRs and other data paths are 16-bit wide, allowing performance of 2 8-bit operations.

Another assumption for convenience and/or simplicity, as previously indicated, although the claimed subject matter is not limited in scope in this respect, is that a reference block is stored in one block of memory and a search window is stored in another. Thus, two accesses (one for reference block data and another for search window data) are employed per cycle. In FIG. 6, new or additional data provided to a register in a given cycle is shown by bold face.

A parallel process to compute 3 SADs with such an architecture may be expressed in terms of pseudo-code as follows, although the subject matter is not limited in scope in this respect (let us assume that x0, x1, ..., x15 are the pixels from a row of the reference block and y0, y1, y2, ... are the corresponding data form the reference block to be matched):

```
Begin
    /* PE0-PE5 in the following are GPE0-GPE5 in FIG. 4. */
    IPE:
        Input the macroblock (x) and the search region (y) and replicate the pixels (x) into
2 copies;
    MPEs:
        Store x and y into the local memories and feed them to PE0, PE1, PE2;
    PE5:
        Configure MPE's to feed data to PE0-PE2 based on the search points generated by
Log Search.
    for row = 0 to 15 do (sequentially 16 rows are computed)
    begin
        /* PE0, PE1, PB2 executes the following block in parallel */
        /* The following tasks T1, T2 and T3 are executed in the architecture in pipelined
        fashion */
        T1: Par begin (PEi)
            /* Two SAD computations in parallel by the dual SAD computation
        circuitry in PE */
            Compute Partial $SAD_i$ (row)
        Par end;
        T2: PE4
            Par: $SAD_i$ ← Accumulate partial $SAD_i$ (row);   T3: PE5:
            Find minimum SAD and generate motion vector (MV);
    End for;
End.
```

For this particular embodiment, the bandwidth capability desired may be recomputed as follows:

Bandwidth to compute 3 SADs=2*(4*8)*16 Bytes=1K Bytes

Bandwidth to compute 1.4M SADs=1.4M*1K/3=460 MB/s

That represents an overall saving of >35% compared to 716 MB/s bandwidth, as computed earlier. The clock cycles to compute a 16×16 SAD may also be determined for this embodiment, e.g., having 3 PEs working in parallel. As discussed, in this example, a PE may compute 2 SADs in parallel, resulting in a potential doubling of the compute performance of the PE.

Hence,

Clocks per PE per row of SAD computation=(16/2) clocks (two SAD computations in parallel, from FIG. 6)

Clocks per PE per 16 rows of SAD computation=(8) *16 clocks (for a 16×16 macroblock)

Clocks per ISP 16×16 SAD computation=(8*16)/3 clocks=43 clocks (3 PEs operation in parallel)

Clocks per ISP for 1.4M SAD computation=43*1.4M clock=57 M clocks

Assuming that ISPs run at 266 MHz, 1 ISP therefore provides the capability to implement LS processing using a 32×32 search window (for a 64×64 search window, 1 ISP may still be employed).

Likewise, bandwidth capability may be determined as follows. An MPE may supply 2 words (16-bits each) per cycle (e.g., 4 bytes per cycle), providing a total bandwidth out of an MPE as 4*266 MB/s or ~1.064 GB/s. By employing in this embodiment 2 MPEs per ISP, total bandwidth capability exceeds 2 GB/s, which is higher than the bandwidth of 460 MB/s. Thus, as demonstrated, for this embodiment, 1 ISP may suitably handle the data bandwidth for a 32×32 search window for block matching.

Figure 7:
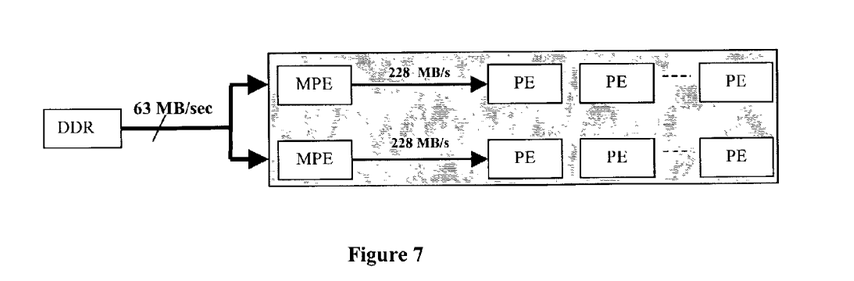
FIG. 7 is a schematic diagram of an embodiment of a DDR channel for an ISP, such as the embodiment shown in FIG. 6.

In the above discussion, synchronous DRAM (SDR) and/or dual-data rate DRAM (DDR) bandwidth to download the reference block and search region information to one or more MPEs is now considered. The bandwidth (from FIG. 1) to download the current block and search window to the previously described embodiment is given by, Bandwidth to download data for 1 macroblock= (16*16)+(32*32)+(16*16) Bytes Bandwidth to download 1367 blocks=1367*1536 Bytes Bandwidth desired per second=30*1367*1536 B/s=63 MB/s Assuming one DDR channel (16-bit wide and running at 133 MHz), provides a total bandwidth of 2*133*2 MB/s or 512 MB/s, this is more than sufficient. The top level bandwidth estimation at different communication points for this embodiment is illustrated in FIG. 7.

It will, of course, be understood that, although particular embodiments have just been described, the claimed subject matter is not limited in scope to a particular embodiment or implementation. For example, one embodiment may be in hardware, such as implemented to operate on an integrated circuit chip, for example, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging or video system, for example, may result in an embodiment of a method in accordance with the claimed subject matter being executed, such as an embodiment of a method of performing motion estimation, for example, as previously described. For example, an image or video processing platform or another processing system may include a video or image processing unit, a video or image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. An integrated circuit comprising:
signal processing engines including processing elements, the processing elements mutually coupled by a register file switch, the register file switch to provide a non-blocking communication between the processing elements, and to direct register data to one or more of the processing elements, an image signal processing engines to perform a block matching calculation comprising a sum of absolute differences for a logarithmic search of a search window; and
the processing elements further mutually coupled by the register file switch such that, during the block matching calculation, parallel processing and pixel data sharing of reference block pixel locations is employed by the processing elements.

2. The integrated circuit of claim 1, wherein the image signal processing engines comprise at least three processing elements that, during a block matching calculation, process pixel data in parallel.

3. The integrated circuit of claim 2, wherein the image processing engines further comprise at least two processing elements to store and feed reference block and search window pixel data values in parallel to the at least three processing elements.

4. A method comprising:
performing a block matching calculation, the block matching calculation including a sum of absolute differences for a logarithmic search of a search window, the sum of absolute differences includes computing a motion vector by comparing a references block to a corresponding block in a previous frame, wherein the block matching calculation is performed by image signal processing engines having processing elements mutually coupled by a register file switch, the register file switch providing non-blocking communication between the processing elements, and directing register data to one or more of the processing elements;
processing reference block pixel locations in parallel during the block matching calculation; and
sharing overlapping pixel data common to the reference block pixel locations.

5. The method of claim 4, wherein the reference block pixel locations comprise consecutive reference block pixel locations.

6. The method of claim 4, wherein the block matching calculation comprises a full search sum of absolute differences for a full search of a search window.

7. An image processing system comprising:
an image processing unit coupled with a storage medium and an input/output device, the image processing unit comprising:
image signal processing engines to perform a block matching calculation comprising a sum of absolute differences for a logarithmic search of a search window, the sum of absolute differences includes computing a motion vector by comparing a references block to a corresponding block in a previous frame, wherein the processing elements being mutually coupled to form a mesh configuration, the processing engines including processing elements coupled by a register file switch, the register file switch to provide non-blocking communication between the processing elements, and to direct register data to one or more of the processing elements; and
the processing elements being further mutually coupled by the register file switch such that, during the block matching calculation, parallel processing and pixel data sharing of reference block pixel locations is employed by processing elements.

8. The system of claim 7, wherein the one or more image signal processing engines comprise at least three processing elements that, during a block matching calculation, process pixel data in parallel.

9. The system of claim 8, wherein the one or more image processing engines further comprise at least two processing elements to store and feed reference block and search window pixel data values in parallel to the at least three processing elements.

10. A computer-readable medium comprising computer program which, when executed, cause a computer to:
perform a block matching calculation, the block matching calculation including a sum of absolute differences for a logarithmic search of a search window, the sum of absolute differences includes computing a motion vector by comparing a references block to a corresponding block in a previous frame, wherein the block matching calculation is performed by image signal processing engines having processing elements mutually coupled by a register file switch, the register file switch providing non-blocking communication between the processing elements, and directing register data to one or more of the processing elements;
process reference block pixel locations in parallel during the block matching calculation; and
share overlapping pixel data common to the reference block pixel locations.

11. The computer-readable medium of claim 10, wherein the reference block pixel locations comprise consecutive reference block pixel locations.

12. The compuer-readable medium of claim 10, wherein the block matching calculation comprises a full search sum of absolute differences for a full search of a search window.

* * * * *

UNITED STATES PATENT AND TRADEMARK OFFICE
CERTIFICATE OF CORRECTION

PATENT NO. : 7,266,151 B2
APPLICATION NO. : 10/242148
DATED : September 4, 2007
INVENTOR(S) : Acharya et al.

It is certified that error appears in the above-identified patent and that said Letters Patent is hereby corrected as shown below:

In column 7, at line 30, delete "Bytes=1k Bytes", and insert --(=Bytes=1k Bytes)--.

Signed and Sealed this

Twenty-ninth Day of April, 2008

JON W. DUDAS
*Director of the United States Patent and Trademark Office*